J. B. Underwood,
Washing Machine.
No. 86,330.  Patented Jan. 26, 1869.
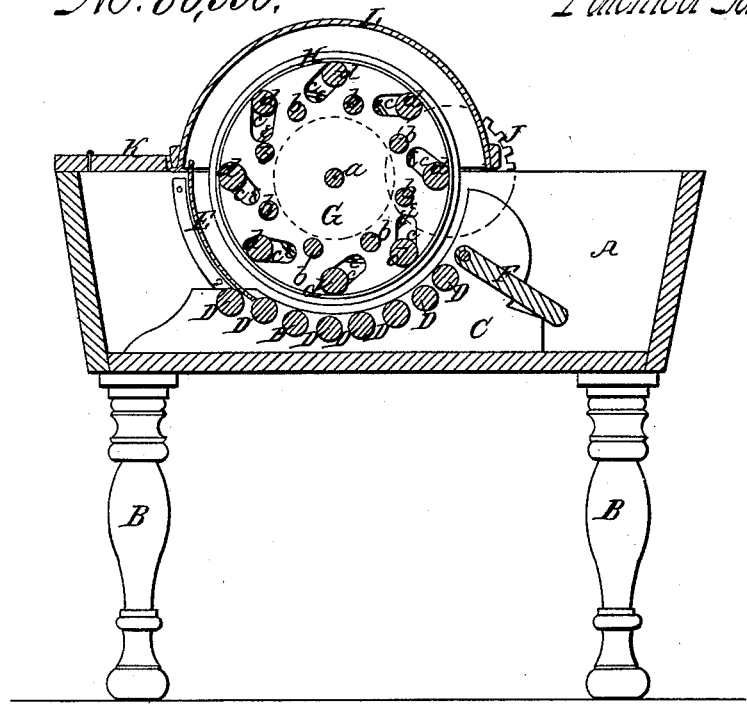
Fig. 2.
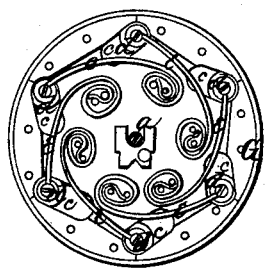
Fig. 3.
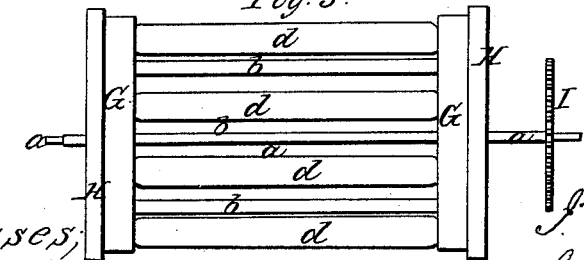
Witnesses,
Harry King
Leopold Ebert
Inventor,
J. R. Underwood
per
Alexander Mason
Attys.

J. R. UNDERWOOD, OF PARKERSBURG, WEST VIRGINIA.

Letters Patent No. 86,330, dated January 26, 1869.

---

IMPROVED WASHING-MACHINE.

---

The Schedule referred to in these Letters Patent and making part of the same.

---

*To all whom it may concern:*

Be it known that I, J. R. UNDERWOOD, of Parkersburg, in the county of Wood, and in the State of West Virginia, have invented a certain new and useful Improvement in Washing-Machine; and do hereby declare that the following is a full, clear, and exact description thereof, reference being had to the accompanying drawings, and to the letters of reference marked thereon.

The nature of my invention consists in journalling the ends of the rollers of a washing-machine cylinder in the springs arranged on the exterior of the cylinder-head, which has a series of oblique slots, so that the rollers will yield in the direction of the slots.

In order to enable others skilled in the art to which my invention appertains, to make and use the same, I will now proceed to describe its construction and operation, referring to the annexed drawings, which form a part of this specification, and in which—

Figure 1 is a sectional side elevation;

Figure 2, an inside view of the cylinder-head; and

Figure 3, a side view of the rotating cylinder.

A represents a rectangular box, of suitable dimensions, which rests on four legs B B.

On the bottom of the box A, a suitable distance from and parallel to the sides of the box, are placed two cleats or ways C C, which are of concave form on its upper edge, that is, describing part of a circle.

Near the upper edges of and between the cleats or ways C C, is placed a number of rollers, D D, which rollers revolve on their journals, said journals having their bearings in the cleats C C.

From near the rear ends of the cleats, a bent metal plate, E, extends upward to the top of the box A, at the same time extending across the box. This curved plate E can be removed, if necessary, when large garments are being washed.

At the front ends of the said cleats C C, which here extend higher up than at the rear, is placed a lid, F, which lid, being hinged to and between the cleats, can be raised or lowered at will by the operator, for the purpose of putting the garments in on to the rollers D D, and confining them while being washed.

Across the centre of the box A is placed a shaft, *a*, which has its bearings in suitable journal-boxes in or on the sides of the box.

On this shaft is placed an open cylinder, consisting of two heads G G, and a series of round bars, *b b*, connecting the same. The length of the round bars *b b* is such that the cylinder-heads G G will fit exactly on the curved edges of the cleats C C, or rather be exactly above the same, as shown in fig. 1.

The cylinder-heads G G are perforated with a series of elongated slots, *c c*, extending, at equal distance from each other, from near the outer edge, and inclining slightly inward, as seen in figs. 2 and 1.

In the slots *c c*, the journals of the rollers *d d* are placed, said journals being supported or having their bearings in the ends of a number of springs, *e e*, placed on the outside of the head, G.

It will be seen that the rollers *d d* have a threefold motion: they revolve on their own journals, revolve with the cylinder, and move in the slots *c c* by the action of the spring *e e*. The arrangement of the said springs can be plainly seen in fig. 2.

On the outside of the heads G G is placed a circular plate or cap, H, which completely covers the springs, so as not to be injured or put out of order. The diameter of the plate H is larger than that of the head, G, so that the edges thereof may extend on the outside of the cleats C C, and assist in keeping the cylinder in place.

On one end of the shaft *a* is a pinion, I, which gears with a cog-wheel, J, suitably arranged on the outside of the box A. Said cog-wheel J being turned by a crank or other suitable means, the requisite motion is imparted to the machine.

Over the machine is placed a semicircular cap, L, which covers the cylinder and the top of the removable curved plate E, leaving the front part open, and the remaining space in the rear of said cap is closed by a hinged lid, K.

The operation and working of the machine are so simple that they need no further explanation, and its advantages over any other washing-machine now in use are too obvious to be mentioned.

I am aware that a washing-machine having a cylinder with a series of movable rollers, whose journals rest upon coiled springs, and move in radially-arranged slots, and are operated about other rollers within the tub or box, is not new.

My invention consists in so arranging movable rollers in a revolving cylinder, upon certain springs, that the action of the cylinder will not tear the clothing, nor the buttons thereon, or the machine be choked in its operation. These difficulties I have obviated by providing the cylinder-heads with a series of slots, cut obliquely therein, the rollers of the cylinder being placed within said slots, and journalled in the ends of the eccentric-shaped wire springs on the outside of the cylinder-heads, so that the clothing is carried around by the rollers, and the rollers gradually receding therefrom as they revolve.

What I claim, is—

The combination of the cylinder-head, furnished with oblique slots, and the rollers *d d*, when journalled in the outer ends of the springs *e e*, to allow the rollers to yield in the direction of the slots, all arranged as and for the purposes set forth.

In testimony that I claim the foregoing, I have hereunto set my hand, this 24th day of October, 1868.

J. R. UNDERWOOD.

Witnesses:
A. N. MARR,
LEOPOLD EVERT.